252-79.4 SR
9/2/86 OR H 000,125

United States Statutory Invention Registration [19]

[11] Reg. Number: H125
[45] Published: Sep. 2, 1986

Nordquist, Jr.

[54] ETCH AND POLISH FOR METAL HALIDES

[75] Inventor: Paul E. R. Nordquist, Jr., Alexandria, Va.

[73] Assignee: United States of America, Washington, D.C.

[21] Appl. No.: 812,086

[22] Filed: Dec. 23, 1985

[51] Int. Cl.[4] ..... C09K 13/06; B44C 1/22
[52] U.S. Cl. ..... 252/79.4; 156/903; 156/625

[56] References Cited

U.S. PATENT DOCUMENTS

| | | | |
|---|---|---|---|
| 2,903,345 | 9/1959 | Hedley et al. | 41/42 |
| 3,629,023 | 7/1968 | Streklow | 156/17 |
| 4,040,896 | 8/1977 | Harrington et al. | 156/645 |
| 4,155,803 | 5/1979 | Hurley et al. | 156/647 |

*Primary Examiner*—John F. Terapane
*Assistant Examiner*—Jack Thomas
*Attorney, Agent, or Firm*—Robert F. Beers; William T. Ellis; Wendell R. Guffey

[57] ABSTRACT

Boric acid, an acidifying agent, and an optional complexing agent are mixed to form an aqueous solution which is used to etch and polish metal halide. The solution is used to wet a polishing pad which is mounted on a rotating planar wheel. The metal halide is brought into contact with the pad thereby polishing the surface of the metal halide.

18 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ETCH AND POLISH FOR METAL HALIDES

BACKGROUND OF THE INVENTION

This invention relates generally to etching and polishing compositions and particularly to a etch and polish composition for metal halides.

Metal halides, especially single crystal alkaline earth metal halides, have applications as semiconductor substrates for devices such as photovoltaic diodes, lasers, transistors, and charge coupled devices. For example, U.S. Pat. No. 4,080,723 discloses using single crystal barium fluoride as a substrate for group IV–VI semiconductor diodes to provide detectors for infrared radiation in thermal imaging systems. When employing metal halide salts, such as single crystal barium fluoride as a substrate for such semiconductor applications, it becomes necessary to etch, polish, or otherwise ablate a portion of the salt in order to insure a smooth substrate surface. Prior methods for obtaining a smooth substrate surface have included both mechanical and chemical techniques. U.S. Pat. No. 3,935,302 discloses a mechanical method for obtaining a smooth substrate surface which uses diamond impregnated blades. Recently the usefulness of chemical solutions to remove irregularities on crystal surfaces has been demonstrated by several investigators. Polishes have been developed for such materials as NaCl and KCl to produce high quality substrates for laser applications. U.S. Pat. No. 4,040,896 discloses a chemical polish for $BaF_2$ and $CaF_2$ which uses a mixed sulfuric acid and acetic acid solution for a predetermined immersion period not exceeding about 16 minutes per cycle for $CaF_2$ but can be extended for several hours per cycle for $BaF_2$. The preferred sulfuric to acetic acid parts ratio is about 4 to 9 for polishing the $BaF_2$ crystal surface and about 3 parts to 2 parts for polishing the $CaF_2$ crystal surface. U.S. Pat. No. 4,155,803 discloses the use of monovalent acids, including especially inorganic acids such as nitric acid, as well as halogen containing acids, as preferred hydrochloric acid, to chemically ablate the metal halide salt in aqueous solutions when exposed to low temperatures thereby producing a smooth surface.

Use of mechanical methods, however, to smooth the substrate surface can cause undesired chipping and cracking that impairs the usefulness of the device. Similarly, prior chemical methods have not obtained the required smoothness of the crystal surface which also limits the usefulness of the device.

SUMMARY OF THE INVENTION

It is, therefore, an object of the present invention to provide a process for etching and polishing the surface of metal halide crystals.

Another object of this invention is to provide a chemical composition for etching and polishing the surface of metal halide crystals.

Another object of this invention is to provide a metal halide crystal having a very smooth surface suitable for use as a substrate.

These and other objects are accomplished by exposing the metal halide to a boric acid solution containing an acidifying agent and optionally a complexing agent.

In the preferred embodiment, boric acid, a complexing agent, and glacial acetic acid are mixed to form an aqueous solution which is used to polish the metal halide. The solution is used to wet a polishing pad which is mounted on a rotating planar wheel. The metal halide is brought into contact with the pad thereby polishing the surface of the metal halide.

Other objects, advantages, and novel features of the present invention will become apparent form the following detailed description of the invention.

DETAILED DESCRIPTION OF THE INVENTION

An etchant and polish for slightly soluble metal halides comprises a solution of boric acid ($H_3BO_3$) containing an acidifying agent. A desirable, but not necesary refinement of the invention, is the inclusion of a complexing agent to aid and regulate the dissolution of the metal halide, particularly metal fluorides. The boric acid promotes solution of the metal halides by formation of haloborates in the presence of hydrogen ions, i.e. for $BaF_2$, $Ba(BF_4)_2$ is formed. The rate of dissolution, etching or polishing, is determined by many experimental variables, some of which are: concentration of boric acid and acidifying agent, temperature, and orientation of the crystal since not all crystalline faces are attacked equally. The presence and concentration of a complexing agent further regulates the rate and specificity of the dissolution process. When the dissolution is conducted in an unstirred solution etch pits are formed; when the solution is used with a polishing pad a smooth damage free surface results from the increased solubility of the fluoride, if proper crystalline orientations are selected.

The preferred metal halides are $BaF_2$, $CaF_2$, $ZrF_4$, and $LaF_3$, with $BaF_2$ being most preferred. Barium fluoride is a particularly difficult material to etch or polish because of its very slight solubility.

In general, weak organic acids with dissociation constants between $1\times10^{-2}$ and $1\times10^{-6}$ work very well in the present invention. Acetic, propionic, citric, oxalic and malonic acids are preferred with acetic acid being most preferred. Any complexing agent, either in the acid form or as one or more of several possible soluble salts, could function in the present invention but nitrilotriacetactic acid (NTA), ethylenediamine tetraacetic acid (EDTA), citric acid, and tartaric acid are preferred with nitrilotriacetactic acid (NTA) being most preferred.

The solution of the present generally comprises between about 1–30 percent by weight of boric acid, between about 0.1–20 percent by weight of an acidifying agent, and up to about 15 percent by weight of a complexing agent.

Generally, the solution is placed in contact with the metal halide crystal and allowed to stand until the etch pits are developed across the crystal surface corresponding to crystalline defects. Alternatively, the solution is used to wet a polishing pad which is mounted on a device which can rub the pad against the halide crystal, typically a rotating surface. The solution on the pad is contacted with the halide crystal thereby producing a uniformly polished crystal surface.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE I

A synthetic nonwoven polishing pad mounted on a rotating planar wheel and wetted with a solution comprising the proportions 20 ml $H_3BO_3$ solution (4% by weight), 0.7 gm NTA (trisodium salt), and 2 ml glacial acetic acid in a solution volume of 50 ml produced a uniformly polished $BaF_2$ surface when contacted with a crystal.

EXAMPLE II

A synthetic nonwoven polishing pad mounted on a rotating planar wheel and wetted with a solution comprising the proportions 20 ml $H_3BO_3$ solution (4% by weight) and 3 gm tartaic acid in 100 ml volume produced a uniformly polished $BaF_2$ surface when contacted with a crystal.

EXAMPLE III

A synthetic nonwoven polishing pad mounted on a rotating planar wheel and wetted with a solution comprising the proportions 20 ml (4% by weight) $H_3BO_3$ and 4.4 gm of citric acid in a solution volume of 50 ml produced a uniformly polished $CaF_2$ surface when contacted with a crystal.

EXAMPLE IV $BaF_2$ was immersed in a solution of 4% boric acid containing 1.7 moles of acetic acid per liter. After standing two hours at 45° C. etch pits are developed across the crystal surface corresponding to crystalline defects.

Etches and polishes are useful for delineating defects in crystalline material and in producing a smooth, damage free surface suitable for subsequent use, e.g., as a substrate for epitaxial growth. $BaF_2$ and similar materials are useful as substrates and in a variety of applications requiring infrared transparent materials.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A composition suitable for etching and polishing metal halides in an aqueous solution, comprising:

between about 1–30 percent by weight of boric acid;

between about 0.1–20 percent by weight of an acidifying agent; and up to about 15 percent by weight of a complexing agent.

2. The composition of claim 1 wherein said acidifying agent is a weak organic acid with a dissociation constant between $1\times10^{-2}$ and $1\times10^{-6}$.

3. The composition of claim 2 wherein said acidifying agent is selected from the group consisting of acetic, propionic, citric, oxalic and malonic acids.

4. The composition of claim 3 wherein said acidifying agent is acetic acid.

5. The composition of claim 1 wherein said complexing agent is selected from the group consisting of nitrilotriacetactic acid (NTA), ethylenediamine tetraacetic acid (EDTA), citric acid, and tartaric, acid, either as acids or as salts thereof.

6. The composition of claim 5 wherein said complexing agent is nitrilotriacetactic acid (NTA), either as the acid or salt thereof.

7. A process for etching and polishing metal halides in an aqueous solution, comprising the steps of;

contacting the aqueous solution with said metal halide, said aqueous solution comprising:

between about 1–30 percent by weight of boric acid;

between about 0.1–20 percent by weight of an acidifying agent; and up to about 15 percent by weight of a complexing agent.

8. The process of claim 7 wherein said contacting step further comprises the steps of:

wetting a polishing cloth with said solution;

contacting said polishing cloth with said metal halide; and moving said cloth with respect to said metal halide thereby polishing said metal halide.

9. The process of claim 8 wherein said metal halide is selected from the group consisting of $BaF_2$, $CaF_2$, $ZrF_4$, and $LaF_3$.

10. The process of claim 9 wherein said contacting step comprises contacting said solution with $BaF_2$.

11. The product of the process of claim 7.

12. The product of the process of claim 10.

13. A process for etching and polishing metal halides, in an aqueous solution comprising the steps of;

contacting the aqueous solution with said metal halide, said aqueous solution, comprising:

about 3 percent by weight of boric acid;

about 6 percent by weight of an acidifying agent; and about 2 percent by weight of a complexing agent.

14. The process of claim 13 wherein said contacting step further comprises the steps of:

wetting a polishing cloth with said solution;

contacting said polishing cloth with said metal halide; and moving said cloth with respect to said metal halide thereby polishing said metal halide.

15. The process of claim 14 wherein said metal halide is selected from the group consisting of $BaF_2$, $CaF_2$, $ZrF_4$, and $LaF_3$.

16. The process of claim 15 wherein said contacting step comprises contacting said solution with $BaF_2$.

17. The product of the process of claim 13

18. The product of the process of claim 16.

* * * * *